(12) United States Patent
Mahler et al.

(10) Patent No.: US 12,308,640 B2
(45) Date of Patent: May 20, 2025

(54) SYSTEMS AND METHODS OF ENERGY STORAGE SYSTEM OPERATION

(71) Applicant: PEAK POWER, INC., Toronto (CA)

(72) Inventors: Ahren Mahler, Toronto (CA); Robert Bruce, Cambridge (CA)

(73) Assignee: Peak Power Inc. (CA)

( * ) Notice: Subject to any disclaimer, the term of this patent is extended or adjusted under 35 U.S.C. 154(b) by 443 days.

(21) Appl. No.: 17/681,455

(22) Filed: Feb. 25, 2022

(65) Prior Publication Data

US 2023/0275455 A1    Aug. 31, 2023

(51) Int. Cl.
H02J 13/00    (2006.01)
G05B 19/042   (2006.01)
H02J 3/00     (2006.01)

(52) U.S. Cl.
CPC ...... *H02J 13/00002* (2020.01); *G05B 19/042* (2013.01); *H02J 3/003* (2020.01); *H02J 3/004* (2020.01); *G05B 2219/2639* (2013.01); *H02J 2203/20* (2020.01)

(58) Field of Classification Search
CPC ........ H02J 13/0002; H02J 3/003; H02J 3/004; H02J 2203/20
See application file for complete search history.

(56) References Cited

U.S. PATENT DOCUMENTS

| | | | |
|---|---|---|---|
| 9,870,593 B2 | 1/2018 | Sedighy et al. | |
| 2011/0282508 A1 | 11/2011 | Goutard et al. | |
| 2014/0070756 A1* | 3/2014 | Kearns | H02J 13/00034 320/101 |
| 2014/0281645 A1 | 9/2014 | Sen et al. | |
| 2016/0372925 A1* | 12/2016 | Chow | H02J 3/32 |
| 2017/0373500 A1 | 12/2017 | Shafi et al. | |
| 2019/0312457 A1 | 10/2019 | Li et al. | |
| 2022/0060016 A1* | 2/2022 | Mitsunaga | H02J 7/34 |
| 2023/0011716 A1* | 1/2023 | Kahn | G01R 31/385 |
| 2023/0139514 A1* | 5/2023 | Tennant | H02J 7/0071 700/291 |

FOREIGN PATENT DOCUMENTS

CA    2858189    6/2013

OTHER PUBLICATIONS

Foreign Search Report on PCT DTD Apr. 5, 2023.

* cited by examiner

*Primary Examiner* — Mohammad Ali
*Assistant Examiner* — Vincent W Chang
(74) *Attorney, Agent, or Firm* — Foley & Lardner LLP

(57) ABSTRACT

A system can detect an event at a first grid connected to a second grid via a meter monitored by a utility provider that distributes electricity via the second grid. A controller of a first grid can receive data including amounts of electricity consumption monitored by a corresponding plurality of sub-meters on the first grid and state information for energy storage systems on the first grid. The system can determine, responsive to the event, to modify a set point for one of the energy storage systems based on the state information and the amounts of electricity consumption monitored by the sub-meters on the first grid. The data processing system can provide, based on the determination, one or more commands to the controller to modify the set point for at least one of the plurality of energy storage systems on the first grid.

20 Claims, 6 Drawing Sheets

SYSTEMS AND METHODS OF ENERGY STORAGE SYSTEM OPERATION

BACKGROUND

An electrical utility distribution grid can provide electricity to various locations, such as homes, apartment buildings, facilities, factories, hotels, hospitals or other structures. Devices that can be deployed at such locations and consume electricity can include, for example, machines, tools, industrial or production systems, consumer electronics or any other components that consume electricity. Electricity consuming devices can be connected to a utility grid.

SUMMARY

A utility provider can distribute electricity over a utility grid to a variety of locations. Some locations can include a local grid behind a utility meter. The local grid can include multiple energy loads consuming electricity. The local grid can include multiple energy storage systems (ESSs), such as electrical battery systems, for storing electrical energy. As electricity service from the utility provider can vary in terms of consistency, quality and rates, it can be beneficial to reduce or offset the amount of electricity consumed from the utility provider during a time interval by instead consuming at least some energy stored in the ESSs on the local grid. For example, when a utility provider offers electricity at a higher rate over a particular time interval, the energy stored at the ESSs on the local grid can be used to provide electricity from its stored energy, thereby reducing the amount of electricity from the utility provider at higher rates. By offsetting the energy consumption by using the ESS, the ESS can reduce the likelihood of adverse grid events such as power outages. However, servicing energy loads on the local grid using the ESSs can be challenging as energy loads can vary in size and demand and ESSs can vary in the amount of energy stored at a given moment. Systems and methods of this technical solution can combine the ESSs on the local grid into a system that is controlled remotely by one or more servers. By remotely controlling the ESSs on a local grid, this technical solution can provide a load balanced and aggregated energy storage system. The resulting system can provide a scalable solution that facilitates effectively and efficiently offsetting the amount of electricity drawn from the utility provider during a time interval by using a system that remotely manages, controls and aggregates the operation of the ESSs on the local grid.

At least one aspect of the present disclosure is directed to a system. The system can include a data processing system that can include at least one processor coupled with memory. The system can detect an event at a first grid. The first grid (e.g. a local grid) can be connected to a second grid (e.g. a utility grid) via a meter. The meter can be a utility meter and can be monitored by a utility provider that distributes electricity via the second grid. The system can receive, via a controller of the first grid, data that includes a plurality of amounts of electricity consumption. The plurality of amounts of electricity consumption can be monitored by a corresponding plurality of sub-meters on the first grid. The system can receive data that includes state information for a first energy storage system of a plurality of energy storage systems on the first grid. The system can determine, responsive to the event, to modify a set point for the first energy storage system based on the state information and the plurality of amounts of electricity consumption monitored by the plurality of sub-meters on the first grid. The system can provide, based on the determination to modify the set point in response to the event detected corresponding to the meter monitored by the utility provider, a command to the controller of the first grid. The command can be to modify the set point for the first energy storage system on the first grid.

At least one aspect of the present disclosure is directed to a method. The method can include a method of controlling distributed energy storage systems. The method can include the act of detecting, by a data processing system comprising a processor coupled to memory, an event at a first grid. The first grid can be connected to a second grid via a meter monitored by a utility provider that distributes electricity via the second grid. The method can include an act of receiving data by the data processing system via a controller of the first grid. The received data can include a plurality of amounts of electricity consumption monitored by a corresponding plurality of sub-meters on the first grid, and state information for a first energy storage system of a plurality of energy storage systems on the first grid. The method can include an act of determining, by the data processing system responsive to the event, to modify a set point for the first energy storage system. The set point can be modified based on the state information and the plurality of amounts of electricity consumption monitored by the plurality of sub-meters on the first grid. The method can include the act of providing, by the data processing system, a command to the controller of the first grid to modify the set point for the first energy storage system on the first grid. The act of providing can be based on the determination to modify the set point in response to the event detected corresponding to the meter monitored by the utility provider.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
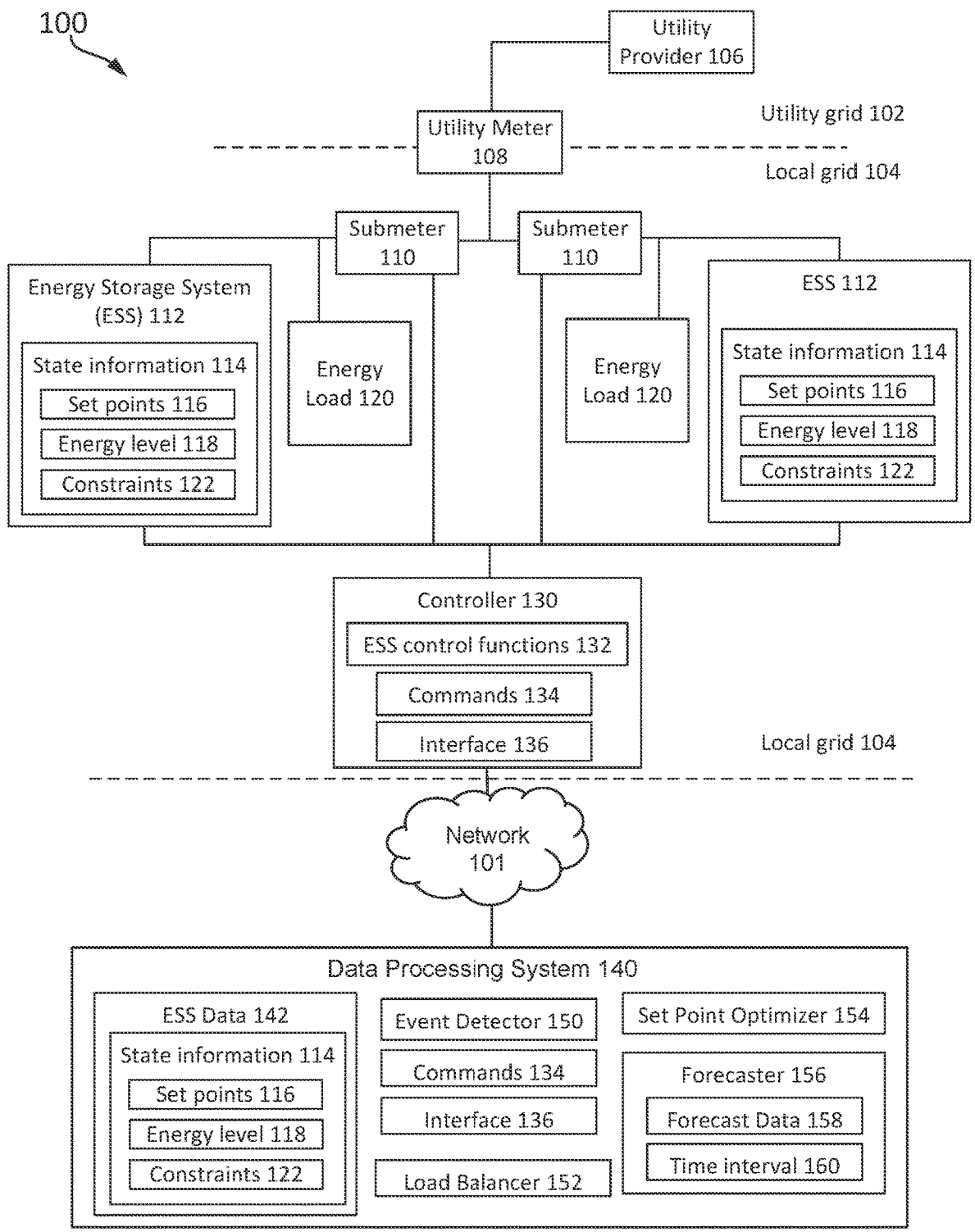
FIG. 1 illustrates an example system to operate multiple energy storage systems.

Following below are more detailed descriptions of various concepts related to, and implementations of, methods, apparatuses, and systems of offsetting, adjusting or reducing the amount of electrical load from an electrical utility grid with a system of remotely controlled multiple ESSs on a local grid behind a utility meter of the utility grid provider. The various concepts introduced above and discussed in greater detail below may be implemented in any of numerous ways.

This disclosure can be directed to systems and methods for managing and controlling the operation of ESSs deployed behind a utility meter to provide electricity that compensates for reduced electricity consumption from the utility provider. This disclosure can be directed to reducing or offsetting the amount of electricity from an electrical utility grid using multiple ESSs deployed behind an electrical utility meter controlled and managed to operate as a single, load balanced and aggregated energy storage system.

As electricity provided by a utility grid can vary in many ways, including in quality, demand, consistency and rates, a user of the utility grid can use locally deployed ESSs for at least a fraction of the electricity provided by the utility grid. Drawing electricity from the ESS can offset the amount of electricity drawn from the utility provider during a time interval. However, as various ESSs can store different amounts of electrical charge at a given time and electrical loads can sometimes be very large and unpredictable, it can be challenging to reliably and efficiently satisfy the electrical demand at a location using ESSs deployed behind the utility meter.

The technical solution described herein addresses these challenges and other challenges by providing systems and methods for remotely controlling the ESSs deployed on a local grid (e.g. behind a utility meter monitored by the utility provider). The technical solution can offset the electricity consumed via the utility grid during a time interval. The present solution can control the ESSs deployed on the local grid from a remote server or a cloud so as to aggregate the energy output from the plurality of ESSs on the local grid. The technical solution can balance the energy levels of the ESS, thus increasing the available energy and durability of the grid. By utilizing the remote server or cloud technology for controlling and managing the ESSs, the present solution can reduce the complexity of the controller that can be deployed on the local grid for controlling the ESSs. For example, a building or a site that can be connected to utility grid via a utility meter can utilize multiple ESSs deployed on a local grid (e.g. behind the utility meter) to respond to an electricity demand to reduce the building's net load electricity drawn from the utility grid. The present solution can utilize a local controller in communication with a data processing system, that can be deployed remotely and on a cloud, to reduce the electricity consumed from the utility grid, supplementing the amount of electricity used for the energy loads by the energy stored across ESSs on the local grid. The present solution can implement this task while also balancing the energy across the ESSs and ensuring that they operate with the desired constrain levels.

FIG. 1 depicts is an example of a system 100 in which a data processing system 140 uses a controller 130 on a local grid 104 to control and aggregate operation of multiple ESSs 112 to provide electricity to energy loads 120. In FIG. 1, a local grid 104 can be connected, via a utility meter 108, to an electrical utility distribution grid 102, which can also be referred to as a utility grid 102. Between the utility grid 102 and the local grid 104, a utility meter 108 can be deployed. The utility meter 108 can be monitored by a utility provider 106. One or more submeters 110 can be connected to the utility meter 108. Submeter 110 can be coupled with and monitor energy storage systems (ESSs) 112 as well as energy loads 120. Submeters 110, utility meter 108, energy loads 120 and ESSs 112 can be connected to, coupled with or in communication with a controller 130. Controller 130 can be deployed on the local grid 104 or outside of it and can communicate to a data processing system 140 over a network 101. Each ESS 112 can include one or more state information 114 which can include one or more set points 116, energy levels 118 and constraints 122. Controller 130 can include one or more ESS control functions 132, commands 134 and interfaces 136 for communicating with the data processing system 140. The data processing system 140 can include one or more ESS data 142 which can include one or more state information 114. The data processing system 140 can include one or more event detectors 150, commands 134, interface 136, set point optimizers 154, load balancers 152 and forecasters 156. A forecaster 156 can include one or more forecast data 158.

Utility grid 102 can include an interconnected network for electricity delivery from producers of electricity to the consumers of electricity. Utility grid 102 can include power stations, electrical substations, transformers and electric power transmission and distribution lines. Utility grid 102 can include electricity synchronized in three phase alternating current (AC) frequencies and can connect to a large number of electricity generators and consumers. Utility grid 102 can include a commercial electric power distribution system that takes electricity from a generator and transmits it over a distance to the consumer. The consumer can receive the electricity from the utility grid 102 via a utility meter 108, such as via an electrical connection to which utility meter 108 is connected or of which it is a part.

A utility provider 106 can include any entity that provides electricity over utility grid 102. Utility provider 106 can include an electric company that generates or provides electricity to the users. Utility provider 106 can include one or more solar or wind farm providing electricity. Utility provider 106 can include one or more electric generation companies providing electricity to homes, apartment buildings, factories, companies and other locations or establishments that use electricity. Utility provider 106 can include the company that monitors the utility meter 108 and provides electricity that is monitored by utility meter 108.

Local grid 104 can include an electrical distribution system for one or more consumers that are connect to the utility grid 102 via a single utility meter 108. Local grid 104 can include an interconnected network for electricity delivery or an electricity distribution system for a customer site or a location that can include one or more apartments, homes, buildings, factories, campuses, lots, studios, complexes, farms, warehouses, hotels, hospitals or other man-made structures that consume electricity. For example, a local grid 104 can include an interconnected network of electrical sockets, electrical wiring or conduits, power stations or substations, transformers, electricity generating devices and electricity consuming devices that can be connected to each outer and to the utility grid 102, via a utility meter 108. Local grid 104 can provide electrical distribution for energy generating devices, such as solar panels or wind turbines and can connect such devices to ESSs 112. For example, energy generating devices can be used to charge ESSs 112 via the local grid 104. The ESSs 112 can be charged via meter 108 from utility grid 102. Local grid 104 can provide electrical distribution for electricity consuming devices that can consume the amount of electricity that can be generally referred to as energy load 120. The local grid 104 can receive electrical utility via a utility distribution grid 102 from a utility provider and can export electrical utility to the utility distribution grid 102 and to the utility provider.

A utility meter 108, which can also be referred to as energy meter 108, or a meter 108, can include any device that measures the amount of electrical energy (e.g., in kilowatt-hours) consumed by an energy user, such as a residence, a business, an electrically powered device or a local grid 104. Utility meter 108 can include an electricity measuring device that measures the amount of electrical power provided to a local grid 104 over a time interval. Utility meter 108 can be deployed with, connected to, or otherwise be a part of the electrical connection between the utility grid 102 and the local grid 104. Utility meter 108 can include the functionality for measuring demand, such as maximum usage of energy at some time interval. Utility meter 108 can measure the cost of the electricity used by a utility grid user. Utility meter 108 can include a smart meter for real-time readings and load monitoring. Utility meter 108 can include the functionality for communicating with electronic communication devices over a network, such as network 101. Utility meter 108 can include the functionality for monitoring and measuring electricity produced or generated from within the local grid 104 and exported back to the utility grid 102. Meter 108 can measure net consumption or generation of energy for billing purposes by the electrical utility provider. Meter 108 can produce data used to interpret the real power output at the point of connection to the utility grid 102. The real energy or power consumption of meter 108 can be the variable controlled by the present technology.

Submeter 110, which can also be referred to as a submeter 110, can include any device that measures amount of electrical energy consumed by one or more energy loads 120 on a local grid 104. Submeter 110 can include hardware, software or a combination of hardware and software for measuring amount of electrical energy consumed by devices on a local grid 104. Submeter 110 can include a device comprising any functionality of a utility meter 108 and can be placed on the local grid 104, at any location behind the utility meter 108. Submeter 110 can measure flow of power at a point in the local grid 104, such as a connection point, and produce data required to interpret the real power output or flow through the point. Submeter 110 can measure amount of electrical energy provided by or to an ESS 112 or an energy load 120. Submeter 110 can be monitor power or energy going to and from the energy load 120 or an ESS 112. Submeter 110 can be connected to the utility meter 108 or any one or more devices connected to the local grid 104. Submeter 110 can be connected to or be in communication with the controller 130. Submeter 110 can be connected to or be in communication with the data processing system 140, such as directly over a line or over a network 101.

Energy load 120 can include any amount of electricity that is consumed by any number of electricity consuming items connected to local grid 104. Energy load 120 can include electrical load from any electricity consuming items, such as electrical machines, systems, products, tools, lighting devices, computing devices, electronics or any other type and form of devices or apparatus that operate by using electricity. Energy load 120 can represent or correspond to electrical and electronic devices consuming electricity. Energy load 120 can include any electricity consumed by devices connected to electrical sockets on a local grid 104. Energy load 120 can include energy generating devices, such as solar or wind turbine devices providing electricity to local grid 104 or charging ESS 112.

Energy storage system 112, also referred to as the ESS 112, can include any system for storing electrical energy. ESS 112 can include, hardware, software or a combination of hardware and software for storing energy and controlling and managing energy storage. ESS 112 can include, for example, a battery system, including any type and form of a battery or a battery system. ESS 112 can include any type and form of an energy storage device. For example, ESS 112 can include one or more individual battery cells that can be combined into a battery module or a battery pack and be collectively referred to as a battery or a battery system. Similarly, ESS 112 can include multiple storage banks, the energy of which can be combined as the total energy output of the ESS 112. Battery module or battery pack can include or be connected to a logic, circuitry or devices for controlling and managing charging and discharging of the battery cells, as well as monitoring their status individually or collectively.

ESS 112 can include any type of battery cells, such as lithium-ion battery cells, nickel metal hydride battery cells or alkaline battery cells. ESS 112 can include solid state batteries that can use solid electrolytes, including oxides, sulfides, phosphates, polyethers, polyesters, nitrile-based materials, polysiloxane and polyurethane. ESS 112 can include functionality for monitoring, setting and controlling the state or rate of charge or discharge of the ESS 112. ESS 112 can keep track of the amount of energy stored in terms of one or more of Watts (W) multiplied by hours (h), such as Watt-hours (Wh), kilo-Wh (kWh), mega-Wh (MWh) or giga-Wh (GWh) of energy.

ESS 112 can include a battery system onboard a vehicle, a machine or an electronic device. For example, ESS 112 can include a battery of a vehicle, such as an electric vehicle, a hybrid vehicle or an electric scooter or a motorcycle. ESS 112 can include a battery of an electric or a hybrid truck. A battery system of an ESS 112 on an electric vehicle can be connected to the local grid 104 via a bi-directional charger. The bi-directional charger can be used to charge and discharge the ESS 112 through the bi-directional charger and the local grid 104. ESS 112 can include a battery of an electric machine, system or a tool, such as an electric saw or a drill. ESS 112 can include a battery of a lamp or a lighting system. ESS 112 can include a battery of a mobile device, such as a computer, tablet, or a sound device.

ESS 112 can be controlled to consume or generate energy (e.g., power output) and can include a constrained state of charge (e.g., a minimum or maximum amount energy stored). The constrained state of charge can affect or control the real power output (e.g. Watts) from the ESS 112. For example, an ESS 112 can provide the data on a real power output of the systems inverter. In the event that there are multiple inverters, the real power can be summed to create the total system output. The ESS can provide the data on a state of charge of the system, such as energy level 118. The state of charge can be available online. In the event that there are multiple storage banks used in the ESS 112, the energy of each bank can be summed to create the total system state of charge for the ESS 112. ESS 112 can include system alerts that can signify to other parts of the system 100, such as the controller 130, that the system or a component of the system is non-operational.

State information 114 can include any information corresponding to the state of the ESS 112. State information 114 can include information about the state or condition of an ESS 112. State information 114 can include settings or operational set points, or internal data such as set points 116 of an ESS 112. State information 114 can include information on energy level stored at the ESS, such as energy level 118 of the ESS 112. State information 114 can include information on constraints 122 of the ESS 112. State information 114 can include information on ESS make and model, operational state or condition, its efficiency and efficacy in storing and providing electrical energy. State information 114 can include information on ESS 112 history, including prior charging and discharging times or duration and charge or discharge data and statistics.

State information 114 can include information from other devices on local grid 104 to determine information about ESSs 112. For example, state information 114 can include energy or power readings or measurements from a submeter 110. Submeter 110 readings or measurements can be used to inform or determine energy or power output of one or more ESSs 112. For example, when a single ESS 112 is the only device monitored by a single submeter 110, the submeter 110 readings can correspond to the ESS 112 power output. For example, when multiple ESSs 112 are monitored by a single submeter 110, the submeter 110 readings can be used to determine the total energy or power output from ESSs 112.

Set points 116 can include any target value at which ESS 112 seeks to maintain its operation. For example, set points 116 can include a target value for an amount of electricity output from ESS 112. A set points 116 can include a target value for a rate of a particular amount of electrical power to be provided over a period of time. Set points 116 can include a target amount of electrical power to be provided, in terms of W, kW, MW or GW. Set points 116 can include a target amount of voltage at which the energy is to be provided. Set points 116 can include a target value for an alternating current (AC) electricity output. Set points 116 can include a target value for a direct current (DC) output. Set points 116 can include a target value for voltage of the electricity output. Set points 116 can include a target value for a time interval during which the electricity is to be output. Set points 116 can include a range of values, such as a range of values between an ESS 112 is to operate, including a range of power or energy output.

Energy level 118 can include any information on the energy level or the state of charge of the ESS 112. The energy level 118 can include the amount of energy currently stored inside of the ESS 112. Energy level 118 can include information of a measured amount of energy level at the ESS 112 or amount of energy level determined or calculated from other indicators, such as the amount of electricity provided and the rate of the electricity provided over time. Energy level 118 can include information of a measurement of energy level discharged from the ESS 112. Energy level 118 can include measurements from a submeter 110. A submeter 110 can monitor output from one or more ESSs 112. Energy level 118 can be expressed in terms of Watt-hours (Wh), kWh, MWh or GWh. Energy level 118 can be expressed in terms of percentage values of the total capacity charge, such as between 0% and 100%, where 0% can be a fully discharged ESS 112 and 100% can be a fully charged ESS 112.

Energy level 118 can include thresholds. Energy level 118 can include a threshold for an energy level below which the ESS 112 is to be charged, such as by the utility provider 106. The threshold level below which the ESS 112 is to be charged can be, for example, 3%, 5%, 10% or 20% of energy. Energy level 118 can include a threshold for identifying an ESS 112 with a low energy level that should have its electricity output reduced by a load balancer 152 during operation. The low energy level threshold can correspond to an ESS 112 having a charge capacity of up to, for example, 5%, 10%, 15%, 20%, 25%, 30%, 35%, 40%, 45% or 50%. Energy level 118 can include a threshold for identifying an ESS 112 as an ESS 112 with a high energy level that should be used to compensate for the reduced electricity production by ESSs that are assisted by the load balancer 152. The high energy level threshold can correspond to an ESS having a charge capacity of at least, for example, 100%, 95%, 90%, 85%, 80%, 75%, 70%, 65%, 60%, 55% or 50%.

Constraints 122 can include any one or more limits or restrictions for the operation of the ESS 112. Constraints 122 can include upper or lower limits of operation to ensure that ESS 112 operation remains within set limits. Constraints 122 can be set by an ESS 112 manufacturer. Constraints 122 can be set by ESS 112 user. Constraints 122 can be set by the data processing system 140. Constraints 122 can be set to maintain ESS 112 within the recommended range of operation. Constraints 122 can include limits for maximum or minimum power output of the ESS 112. Constraints 122 can include limits for maximum or minimum chargeable and dischargeable power output of the ESS 112. Constraints 122 can include limits for maximum or minimum consumption allowed for each ESS 112. Constraints 122 can include limits for maximum or minimum state of charge of the ESS 112. Constraints 122 can include limits for maximum or minimum load for the ESS 112. Constraints 122 can include limits on any one or more of voltage, current, power and time interval for ESS 112.

Controller 130 can include any hardware, software or a combination of hardware and software for communicating with and controlling devices on the local grid 104. Controller 130 can include the logic, circuitry and devices for controlling ESS 112 individually or as a collective. Controller 130 can include one or more microcontrollers, memory, processors or logic devices. Controller 130 can include programming code, software functions and scripts. Controller 130 can include a micro controller that can include a software code for controlling net power consumption of one or more submeters 110. Controller 130 can control a submeter 110 by sending commands 134 for power to be output by an ESS 112 on a local grid 104. Controller 130 can control all submeters 110 by sending power output commands to all ESSs 112, depending on their individual state information 114. Controller 130 can include functionality for communicating with ESS 112, receiving information from and sending information to ESS 112 or any other devices on local grid 104. Controller 130 can include the functionality for sending commands 134 to ESS 112 or any other devices on local grid 104. Controller 130 can include the functionality for controlling each of the ESS 112 on the local grid 104 using ESS control functions 132. Controller 130 can communicate with devices on local grid 104 via interface 136.

ESS control functions 132 can include functions for controlling individual ESS 112 on the local grid 104. ESS control functions 132 can include hardware, software or a combination of hardware and software, including instructions, logic, circuitry, devices, computer code and scripts. ESS control functions 132 can include the functionality, such as algorithms, for communicating with and controlling individual ESS 112, receiving data from an ESS 112, sending instructions to an ESS, such as commands 134. ESS control functions 132 can include the functionality for monitoring, managing, adjusting, establishing, setting or resetting set points 116, energy level 118 or constraints 122 for any ESS 112. ESS control functions 132 can monitor ESS 112 operation and status in real time and provide alerts or communications to data processing system 140.

Commands 134 can include any instructions or commands for controlling or managing ESS 112. Commands 134 can include instructions or commands for determining, reading from or writing to state information 114. Commands 134 can include instructions or commands for setting or resetting set points 116. Commands 134 can include instructions or commands for determining or reading energy level 118. Commands 134 can include instructions or commands for reading or writing to constraints 122.

Interface 136 can include any hardware, software or a combination of hardware and software for interfacing with any devices on system 100. Interface 136 on a controller 130 can include instructions, logic, circuitry, devices, computer code and scripts for establishing and implementing communications between any one or more of utility meter 108, submeter 110, ESS 112, energy load 120, controller 130 or data processing system 140. Interface 136 can include functionality for communicating via wires or lines or wirelessly. Interface 136 can include the functionality for communicating via a network 101 or through grid, such as local grid 104. Interface 136 can include any computer or a digital system interface for digital communication or interaction between the data processing system 140, controller 130, ESS 112, submeter 110, energy load 120 and utility meter 108. Interface 136 can include a web browser interface, a graphical user interface, a menu interface, a form based interface or a natural language interface. Interface 136 can include a user interface to enable a user to manually receive and send data.

Network 101 can include a worldwide network and/or a local area network. The network 101 can include a wireless network or a network of physically coupling network components. The network 101 can include a network implementing network components via a cloud. For example, each of each of ESS 112, controller 130, data processing system 140, submeter 110, utility meter 108, energy load 120 can exchange information over network 101 using any number of network communication protocols, such as the transmission control protocol/internet protocol (TCP/IP). Network 101 can include a cloud environment, including shared computer resources and data that can be available on demand. The network 101 can be local network, wide area network or a world wide web. Network 101 can be hosted inside or outside the parameters of the local grid 104.

Data processing system 140 can include any system for determining, controlling or managing operation of ESSs 112. Data processing system 140 can include hardware, software or a combination of hardware and software for managing operation of devices on a local grid 104, such as ESS 112, submeters 110 and energy loads 120. Data processing system 140 can include instructions, logic, circuitry, devices, computer code and scripts for controlling, managing or operating devices on a local grid, such as ESS 112. Data processing system 140 can include functionality for monitoring or reading from state information 114 and determining, adjusting or resetting set points 116. Data processing system 140 can include any functionality of its components, including for example, event detector 150, load balancer 152, set point optimizer 154 and forecaster 156. The data processing system 140 can acquire or obtain data from one or more of the utility meter 108, submeter 110, or ESS 112. The data processing system 140 can acquire or obtain the data from one or more of the utility meter 108, submeter 110, or ESS 112 in real-time, based on a time interval, or responsive to a request for data.

Data processing system 140 can include one or more ESS data 142. ESS data 142 can include any collection of data for ESS 112. ESS data 142 can include a database for storing information about one or more ESS 112. ESS data 142 can include a database. ESS data 142 can be organized by individual ESS 112 on the local grid 104. ESS data 142 can include any information on an ESS 112, including any state information 114, set points 116, energy level 118 and constraints 122. ESS data 142 can include real time data from ESS 112. ESS data 142 can include data from or related to energy load 120. ESS data 142 can include data from or related to submeter 110.

Data processing system 140 can include the functionality to simulate operation of ESSs 112. Data processing system 140 can simulate ESSs along with their state information 114, including set points 116, energy levels 118 and constraints 122. Data processing system 140 can simulate electricity output, including from the standpoint of power or energy, from each ESS on the local grid 104. Using the simulation, data processing system 140 can determine if the set points 116 simulated for the ESSs 112 will provide the intended amount of electricity in aggregate, while ensuring that each ESS 112 operates within constraints 122. Data processing system 140 can determine if the simulated set points 116 cause the ESSs 112 to provide the intended amount of electricity, while ensuring that the ESSs 112 are load balanced. ESSs 112 can be load balanced, for example, when ESSs 112 with higher energy levels 118 provide more electricity than ESSs 112 with lower energy levels 118.

ESS data 142 can include any real time data from local grid 104. ESS data 142 can include real time data from utility meter 108, submeter 110, energy loads 120 and ESSs 112. ESS data 142 can include real time measurements of energy readings, energy state or electricity flow around local grid 104. The measurements can be time stamped. The measurements can be organized into a series, come from any devices in the system 100 and include regularly or periodically updated data.

Data processing system 140 can include one or more event detectors 150. Event detector 150 can include any functionality for detecting or determining events on system 100. Event detector 150 can include any functionality for receiving and interpreting data from controller 130. Event detector 150 can receive an instruction or information or determine a request to provide energy from ESS 112, such as a net utility load command. Event detector 150 can determine that one or more ESSs 112 are to provide electricity at a particular time or over a particular interval. Event detector 150 can receive information or determine that energy load 120 has changed, is changing, is about to change or will change, an in response determine that an event is taking place on local grid 104.

Events detected by the event detector 150 can include any indication corresponding to the energy or power provided from ESSs 112. Events can correspond to a demand response event, conservation event, peak event, or peak hours. For example, the event detector 150 can receive information from a utility provider 106 that a rate of electricity is going to increase in response to a higher demand. For example, the event detector 150 can receive a notification, indication, or instruction from the utility provider 106 or other entity to reduce or conserve energy consumption from the utility grid during a time interval. For example, event detector 150 can receive or detect an event corresponding to an indication of the amount of power or energy output to provide from ESSs 112 on the local grid. For example, event detector 150 can detect an indication that over the next one hour, ESSs 112 should provide a particular percentage of overall electricity consumed on the local grid 104. For example, event detector 150 can detect an indication to offset the electricity from the utility grid 102 with the energy from ESSs 112, by about or up to 10%, 20%, 30%, 40%, 50%, 60%, 70%, 90% and 100% of total electricity needs of the local grid 104.

Event detector 150 can detect the event indicating that the upper limit of the amount of electricity to consume from the utility grid. For example, event detector 150 can detect an event indicating that over a particular time interval, such as the next 6 hours, the electricity drawn from the utility grid is to be limited to a particular value. In response to that limitation, the event detector 150 can determine that the ESSs 112 shall over the next 6 hours provide all of the electricity above the set limit, to make up the difference.

Data processing system 140 can include one or more set point optimizers 154. Set point optimizer 154 can include any hardware, software or a combination of hardware and software for determining, establishing or calculating a set point 116 for ESS 112. Set point optimizer 154 can include instructions, logic, circuitry, devices, computer code and scripts for determining a set point 116. Set point optimizer 154 can include functions, algorithms and methodologies for determining set point 116 based on inputs from submeters 110, energy loads 120 ESSs 112, utility meter 108. Set point optimizer 154 can include functionality for determining set points 116 based on constraints 122 and energy levels 118 for ESSs 112 collectively as a group or individually.

The data processing system 140 can include one or more forecasters 156. The forecaster 156 can include any hardware, software or a combination of hardware and software for predicting or forecasting values or data. Forecaster 156 can include instructions, logic, circuitry, devices, computer code and scripts for predicting or forecasting energy consumption from one or more energy loads 120 over a time interval. Forecaster 156 can include functionality for predicting amount of energy or power to be provided by one or more ESSs 112. The forecaster 156 can predict an amount of energy or power to be provided by all ESSs 112 on a local grid 104. Forecaster 156 can predict amount of energy or power to be provided by a specific individual ESS 112 of a plurality of ESSs 112. Forecaster 156 can include functionality for predicting an average amount of electricity to be provided by an ESS 112 over a time interval. Forecaster 156 can include functionality for predicting an amount of electricity for each ESS 112 of the plurality of ESSs 112 over a time interval. For example, forecaster 156 can predict or forecast an amount of electricity or power to be provided by all ESSs 112 over a time interval of five minutes. Forecaster 156 can predict the amount of electricity or power to be provided by a particular ESS 112 of the same plurality of ESS 112 over the same time interval of five minutes. The forecaster 156 can be configured with a proportional-derivative logic to forecast the amount of electricity or power consumed on the local grid on a frequent basis. Using the forecasted information from the proportional-derivative logic, the forecaster 156 can determine the amount of electricity or power to be provided by one or more ESSs 112 on the local grid.

Forecaster 156 can predict forecast data 158 for determining set points 116 for a particular time period. For example, forecaster 156 can predict forecast data 158 pertaining to energy or power output of one or more ESSs 112 over a particular time period, and the forecast data 158 can be used to determine set points 116 for the ESSs 112 over the same time period. Forecaster 156 can include or utilize a simulation function to simulate operation of ESSs 112 on the local grid 104. Forecaster 156 can simulate each ESS 112 along with its storage information 114 to determine if a particular set point 116 will provide a sufficient electricity output. Forecaster 165 can simulate each ESS 112 to determine if the ESS 112 will operate within the constraints 122 for the given set point 116.

Forecaster 156 can forecast data over any time interval. For example, forecaster 156 can forecast data over anywhere between every 1 second to 24 hours, such as every more than 1 second, 10 seconds, 30 seconds, 1 minute, 2 minutes, 5 minutes, 10 minutes, 15 minutes, 30 minutes, 45 minutes, 1 hour, 2 hours, 3 hours, 6 hours, 9 hours, 12 hours, 18 hours, 20 hours or 24 hours. Sometimes, the time interval over which predictions are made can be greater than 24 hours or less than 1 second.

Forecast data 158 can include any data that is predicted or forecasted by forecaster 156. Forecast data 158 can include predicted values that correspond to energy or power consumption over a time interval, such as energy consumption by one or more energy loads 120. Forecast data 158 can include predicted values for electricity provided by all ESSs 112 on local grid 104 over a time interval. Forecast data 158 can include predicted values for electricity provided by an individual ESS 112 on local grid 104 over a time interval. Forecast data 158 can include predicted values for electricity provided by all ESSs 112 on local grid 104, or a subset of all ESSs 112. Forecast data 158 can include predicted values that are determined responsive to constraints 122 over a time interval.

Time interval 160 can include any time interval for which predictions or determinations are made by a forecaster 156 or a data processing system 140. Time interval can include any interval of time for which an event is determined, such as an event to reduce the amount of electricity provided by a utility provider via a utility meter 108. Time interval 160 can include a time interval of anywhere between one second and one minute, such as up to 1 second, 2 second, 5 seconds, 10 seconds, 20 seconds, 30 seconds, 40 seconds, 50 seconds or 60 seconds. Time interval can include a time interval of anywhere between 1 and 60 minutes, such as 1 minute, 2 minutes, 5 minutes, 10 minutes, 20 minutes, 30 minutes, 40 minutes, 50 minutes or 60 minutes. Time interval 160 can include a time interval of anywhere between 1 and 24 hours, such as 1 hour, 2 hours, 4 hours, 6 hours, 9 hours, 12 hours, 15 hours, 18 hours, 20 hours or 24 hours. Time interval can include any time interval longer than 24 hours, such as 36 hours, 1 day, 2 days, 7 days, 30 days, 90 days, or more.

Data processing system 140 can include one or more load balancers 152. Load balancer 152 can include functionality for balancing electrical load across the plurality of ESSs 112. Load balancer 152 can include any hardware, software or a combination of hardware and software for predicting or forecasting values that can correspond to or relate to determination of set points 116. Load balancer 152 can include instructions, logic, circuitry, devices, computer code and scripts for determining which ESSs 112 will have their energy used for producing electricity and how much. For example, load balancer 152 can include the functionality for determining which ESSs 112 have more energy stored than others. Load balancer 152 can then determine how much more to draw out of ESSs 112 that have higher levels of energy stored than from ESSs 112 that have lower energy levels.

The load balancer 152 can determine a net load request for a utility meter 108. The net load request can refer to the amount of utility to be consumed from the utility grid 102. For example, the net load request can be the gross load consumption of the utility without any ESS minus the amount of electricity provided by the ESSs 112 on the local grid. Based on the net load request, the load balancer 152 can determine how much power to displace using the ESSs 112. The load balancer 152 can first divide the amount of power to displace across the ESSs 112 on the local grid evenly, and then adjust for the constraints for each ESS 112 on the local grid. Load balancer 152 can simulate ESSs 112 to ensure that ESSs 112 are load balanced and operating within constraints. Load balancer 154 can simulate ESSs 112 to modify set points 116 so as to ensure that ESSs 112 with higher energy levels 118 provide more electricity than ESSs 112 with lower energy levels 118.

Data processing system 140 can include or be coupled to a processor that can be coupled to memory. The data processing system 140 can use or include event detector 150 to detect an event at the local grid 104 that is connected to a utility grid 102 via a meter 108. The meter 108 can be monitored by a utility provider 106 distributing electricity via the utility grid 102. The data processing system 140 can include or use an interface 136 to receive data via controller 130 on the local grid 104. The received data can include a plurality of amounts of electricity consumption monitored by a corresponding plurality of sub-meters 110 on the local grid 104. The received data can include state information 114 for a first ESS 112 of a plurality of ESSs 112 on the local grid 104. The data processing system 140 can determine, responsive to the detected event, to modify a set point 116 for at least the first ESS 112 based on the state information 114 and the plurality of amounts of electricity consumption monitored by the plurality of sub-meters 110 on the local grid 104. The data processing system 140 can use the set point optimizer 154 to determine to modify the set point. The data processing system 140 can provide a command 134 to the controller 130 of the local grid 104 to modify the set point 116 for the first ESS 112 on the local grid 104. The command 134 can be provided based on the determination to modify the set point 116 in response to the event detected by the event detector 150 corresponding to the meter 108 monitored by the utility provider 106.

The data processing system 140 can use the event detector 150 to detect the event corresponding to an amount of electricity consumption from the utility provider 106 via the utility grid 102. The data processing system 140 can determine, responsive to the event, to modify the set point 116 to reduce the amount of electricity consumption from the utility provider 106 using the plurality of amounts of electricity consumption corresponding to the plurality of ESSs 112 on the local grid 104. The event can correspond to a limit to the amount of electricity to be consumed or drawn from the utility provider 106 via the utility grid 102. The event can correspond to an amount of electricity to consume from the ESSs 112 on the local grid 104 to offset the amount of electricity to be consumed or drawn from the utility provider 106.

The data processing system 140 can use the forecaster 156 to predict an amount of electricity consumption for one or more energy loads 120 of the local grid 104 over a time interval 160. The data processing system 140 can determine an average amount of electricity to be provided by each ESS 112 of the plurality of ESSs 112 on the local grid 104 over the time interval 160. The data processing system 140 can use a set point optimizer 154 to determine the average amount of electricity. The average amount of electricity can include the average amount of electricity of the plurality of ESSs on the local grid 104 over the time interval. The time interval can be, for example, an interval of 1 minute, 3 minutes, 5 minutes, 10 minutes, 20 minutes, 30 minutes, 1 hour, 2 hours, 5 hours, 8 hours, 12 hours, 24 hours or more than 1 day.

The data processing system 140 can use the forecaster 156 to predict a first amount of electricity to be provided by the first ESS 112 based on a first state information 114 of the first ESS 112. The data processing system 140 can determine an updated first amount of electricity based on the first amount of electricity exceeding a constraint 122 of the first ESS 112. The data processing system 140 can provide the command 134 to the controller 130 to modify the set point 116 for the first ESS 112 based on the updated first amount of electricity.

The data processing system 140 can use the forecaster 156 to predict a second amount of electricity to be provided by a second ESS 112 of the plurality of ESSs 112 based on the state information 114 and a second state information 114 of the second ESS 112. The data processing system 140 can provide a second command 134 to the controller 130 to modify a second set point 116 for the second ESS 112 on the second amount of electricity. The data processing system 140 can use a set point optimizer 154 to provide the second command 134 to the controller 130.

The data processing system 140 can determine to modify the set point 116 to reduce the first amount of electricity and also modify the second set point to increase the second amount of electricity, based on a determination that a first energy level 118 of the first ESS 112 is below a threshold. For example, the data processing system 140 can utilize a load balancer 152 to determine that the first energy level 118 of a first ESS 112 is below a threshold. Threshold can be, for example, the average energy level 118 for the plurality of ESSs 112, or a set threshold level below which electricity provided by the ESS 112 should be conserved. The load balancer 152 can determine that a second ESS 112 that corresponds to the second amount of electricity is not below the threshold. In response to one or both of these determinations, the load balancer 152 can utilize the set point optimizer 154 to modify the set point 116 of the second ESS to increase the amount of electricity provided by the second ESS 112 and modify the set point 116 of the first ESS to decrease the amount of electricity provided by the first ESS 112. In doing so, the load balancer 152 can ensure that ESSs 112 on the local grid 104 that have a higher energy level 118 provide more electricity and ESSs 112 that have a lower energy level 118 provide less electricity.

The data processing system 140 can determine to modify the set point 116 of the first ESS 112 responsive to determining that the set point 116 of the first ESS 112 is within a constraint 122 of the first ESS 112. For example, a set point optimizer 154 can check if the determined set point 116 causes one or more constraints 122 to be exceeded. In response to determining that the set point 116 is within the one or more constraints 122, or constraint 122 ranges, the set point optimizer 154 can provide the command with the modified set point 116 to the controller 130.

The set point optimizer 154 can determine, for example, that the set point 116 of the first ESS 112 exceeds a constraint 122. The set point optimizer 154 can adjust the set point 116 of the first ESS 112 to fall within the constraint 122. Adjusting the set point 116 of the first ESS 112 so as to not exceed the constraint 122 can, for example, cause the amount of electricity provided by the first ESS 112 to be reduced. In response to the adjustment to the set point 116 of the first ESS 112, the set point optimizer 154 can identify a different, second ESS 112, on the local grid 104 whose set point 116 can be adjusted to provide additional electricity to compensate for the lost electricity caused by adjusting the set point 116 of the first ESS 112. The set point optimizer 154 can then, in response to determining that modifying the set point 116 of the second ESS 112 to draw additional electricity to compensate for the electricity reduced by modifying the set point 116 of the first ESS 112, determine to modify the set point 116 of the second ESS 112 to provide an increased amount of electricity. Set point optimizer 154 can include a simulation functionality for simulating ESSs 112. Set point optimizer 154 can simulate ESSs 112 along with their set points 116, energy levels 118 and constraints 122 on the local grid 104 to determine the amount of electricity that each ESS 112 will provide. Set point optimizer 154 can use the simulation to determine that each ESS 112, given the set points 116 simulated, will operate within the constraints 122.

The data processing system 140 can determine to charge at least one ESS 112 on the local grid 104 using electricity from the utility grid 102. The determination to charge at least one ESS 112 can be in response to a determination that an energy level 118 of this ESS 112 is below a threshold. For example, load balancer 152 can determine that a first ESS 112 on the local grid 104 has an energy level 118 that is below a threshold for state of charge of an ESS 112. The threshold can be, for example, less than 5%, 10%, 15%, 20% or 25% of the total energy storage capacity of the first ESS 112. In response to the load balancer 152 determining that the first ESS 112 has the energy level 118 that is below the threshold, the data processing system 140 can send a command 134 to the controller 130 to have the first ESS 112 charged by the utility provider 106 via the utility grid 102. The data processing system 140 can send the command 134 to charge the ESS 112 from another ESS 112, or from an energy generating device, such as a solar panel or a wind turbine.

The data processing system 140 can provide the command 134 to the controller 130 to modify the set point 116 of the first ESS 112 for a particular time interval, such as a first time interval 160. The data processing system 140 can determine to modify the set point 116 for the first ESS 112 for a second time interval 160 based on updated state information 114 of the first ESS 112. The data processing system 140 can provide a second command 134 to the controller 130 that can include the set point 116 for the first ESS 112 for the second time interval 160.

The data processing system 140 can receive, via the controller 130, a plurality of state information 114 corresponding to the plurality of ESSs 112 on the local grid 104. The data processing system 140 can determine, responsive to the event, to modify a plurality of set points 116 corresponding to the plurality of ESSs 112 based on the plurality of state information 114 and the plurality of amounts of electricity consumption monitored by the plurality of submeters 110 on the local grid 104.

Figure 2:
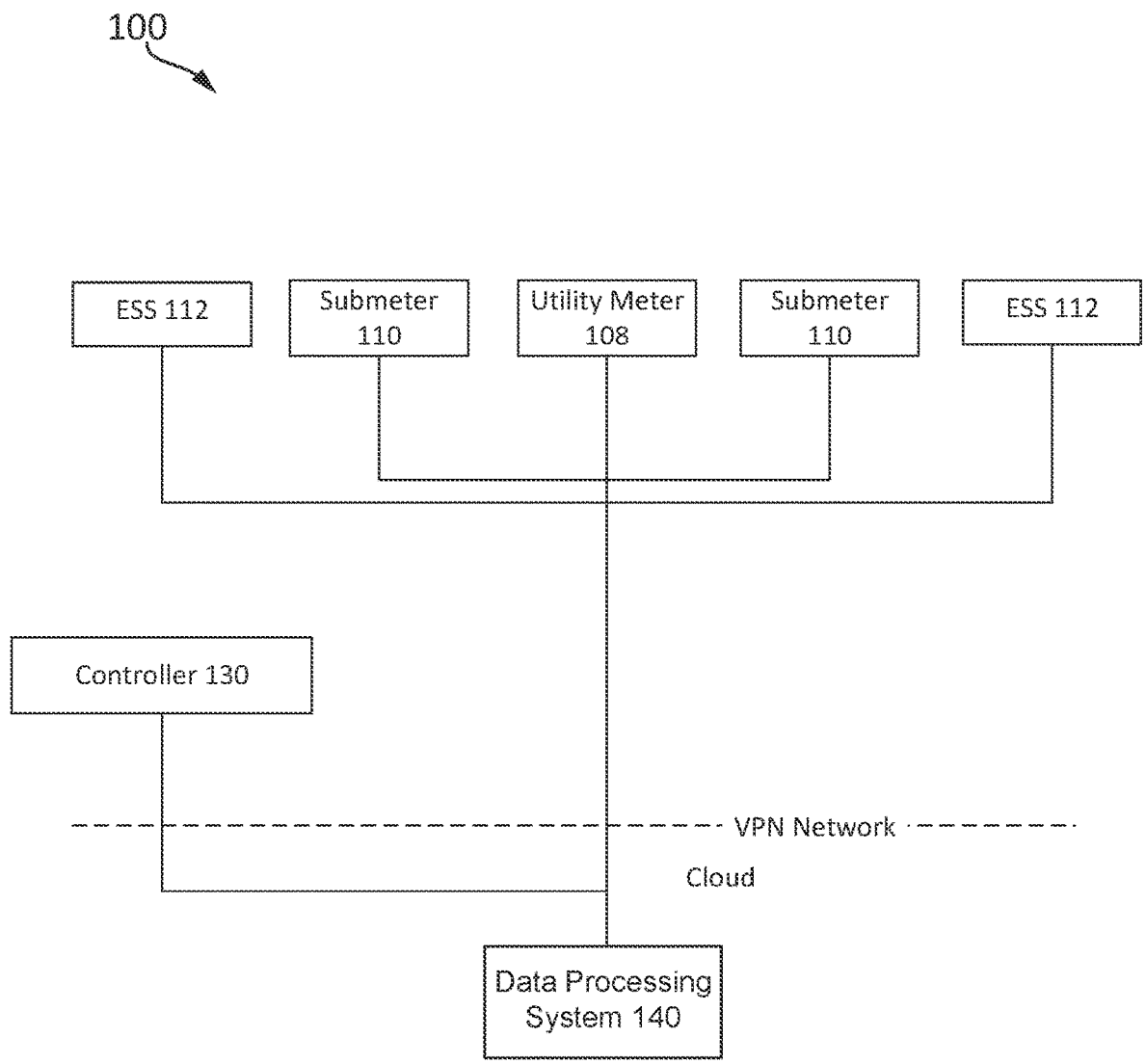
FIG. 2 illustrates an example system to operate multiple energy storage systems.

FIG. 2 illustrates an example of a system 100 in which a data processing system 140 manages operation of ESSs 112 via controller 130 over a virtual private network. In FIG. 2, system 100 includes a utility meter 108, submeters 110, ESSs 112 and controller 130 communicating with the data processing system 140 over a VPN. In the illustrated example, each of ESSs 112, submeters 110, meter 108 and controller 130 can include the interface 136 to communicate with the data processing system 140 and with the controller 130 over a network 101. Each one of ESSs 112, submeters 110, meter 108 and controller 130 can be on a VPN. Data processing system 140 can be on the same VPN or on a different VPN. Data processing system 140 can be operating on a cloud, which may be external to the VPN on which ESS 112, submeter 110, utility meter 108 and controller 130 can operate. Controller 130 and each one of ESSs 112, submeter 110 and utility meter 108 can exchange information between each other over the VPN, such as state information 114, submeter 110 readings and meter 108 readings to the controller 130 as well as commands 134 to the ESSs 112. The data from the meters 108 and 110 as well as ESSs 112 can be made available to the cloud platform.

Figure 3:
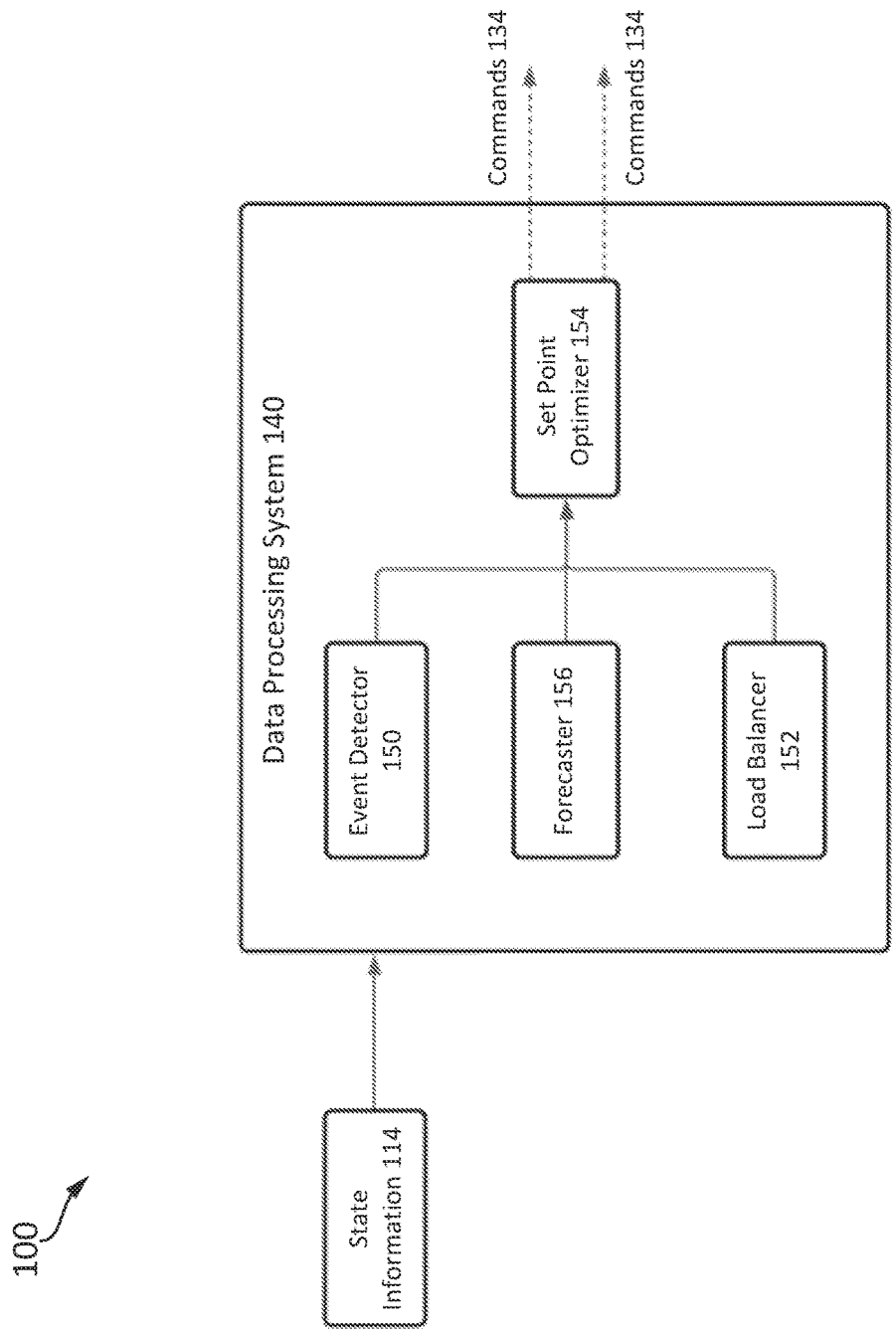
FIG. 3 illustrates an example system to operate multiple energy storage systems.

FIG. 3 illustrates an example of a system 100 in which a data processing system 140 receives state information 114 from various ESSs 112 as input. Data processing system 140 can utilize an event detector 150, a forecaster 156 and a load balancer 152 along with the set point optimizer 154 to issue commands 134 to the ESSs 112 on the local grid. Issued commands 134 can provide individual instructions to each of the ESSs 112 to produce their own amount of electricity over a particular time interval.

State information 114 from any number of ESSs 112 can be received by a data processing system 140. Received state information 114 can include real time data measurements from submeters 110 and meter 108. The event detector 150 can detect a demand response event from a utility provider 106. A demand response event can indicate an increased rate of electricity over a particular time interval. An event detector 150 can detect an event, such as a net utility load command. The net utility load command can indicate or correspond to an upper limit of the amount of electricity to draw or receive from a utility provider 106 via the utility grid and as monitored by utility meter 108. For example, an event can indicate the amount of power output to provide from ESSs 112 on the local grid 104. For example, an event can indicate the limit of the amount of power or energy to consume from the utility grid 102. For example, an event can indicate that ESSs 112 shall offset and make up for the difference between the electricity demanded by the local grid 104 energy loads 120 and the electricity that the utility provider 106 will provide from the utility grid 102 over a particular time interval, such as for example, time interval 160. For example, an event can include a command indicating that ESSs 112 are to make up for the difference between the electricity demanded by the local grid 104 energy loads 120 and the electricity that the utility provider 106 will provide from the utility grid 102 over the next 1 minute, 5 minutes, 30 minutes, 60 minutes, 2 hours, 6 hours, 12 hours or 24 hours. The command can include a time interval, such as a start time and an end time.

Responsive to the event detected, a forecaster 156 can forecast the amount of energy or power to be provided the ESSs 112 over a time interval 160. For example, the forecaster 156 can forecast the amount of electricity that all users on the local grid 104 will consume over the next 1 minute, 3 minutes, 5 minutes, 7 minutes, 10 minutes, 15 minutes 20 minutes, 30 minutes, 45 minutes or an hour. The forecasted data 158 can relate to the total amount of energy or power to be demanded by the local grid 104, to be provided by the utility provider 106 or to be provided by one or more ESSs 112. Forecaster 156 can forecast the amount of energy or power to be provided by each individual ESS 112 on the local grid 104. Forecasting can be done in view of the constraints 122 to ensure that each ESS 112 operates within its own constraints 122. Load balancer 152 can be used to determine changes or differences to the amount of power or energy each individual ESS 112 will provide over the next time interval 160. Load balancer 152 can ensure that more energy is provided by ESSs 112 whose energy levels 118 are high and less energy is provided by ESSs 112 whose energy levels 118 low. For example, a load balancer can determine that a first ESS 112 has an energy level 118 that is below a threshold for a low energy level ESS 112 and that a second ESS 112 has an energy level 118 that is above a threshold for a high energy level ESS 112. In response to these determinations, the load balancer 152 can increase the amount of electricity provided by the second ESS 112 and reduce the amount of electricity provided by the first ESS 112.

The load balancer 152 can check that adjusted amounts of energy remain within constraints 122. Set point optimizer 154 can determine set points 116 for each of the ESSs 112 over the next time interval and send commands 134 to the ESSs 112 to adjust their set points 116 accordingly to achieve the intended energy or power level production from each ESS 112 individually and achieve the sum energy or power level production from all ESSs 112 in aggregate.

Figure 4:
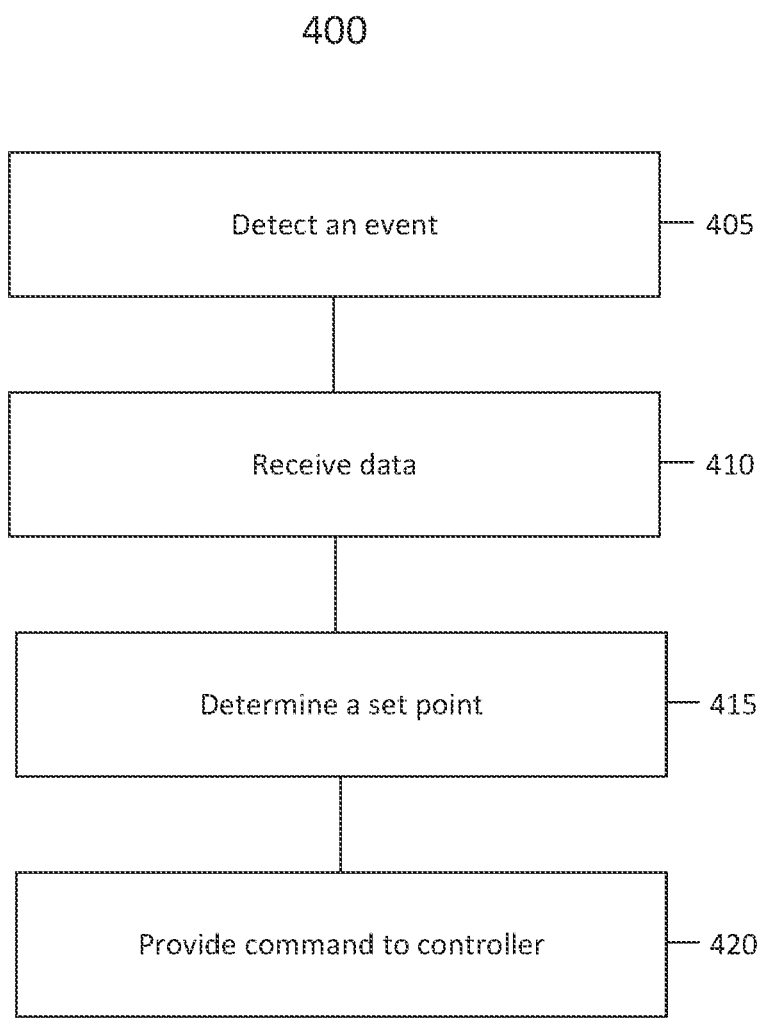
FIG. 4 illustrates an example method for operating multiple energy storage systems.

FIG. 4 illustrates an example method 400. The method 400 can be implemented by system 100 and can include ACTS 405 through 420. The method can include ACT 405 of detecting an event. At ACT 410, data can be received. At ACT 415, a set point can be determined. At ACT 420, a command can be provided to the controller.

At ACT 405 an event can be detected. For example, a data processing system including a processor coupled to memory can detect an event at a first grid. For example, the event detector of the data processing system can detect the event on the first grid. The first grid can be a local grid that is connected to a second grid (e.g., a utility grid), via a meter monitored by a utility provider that can distribute electricity via the second grid. The detected event can correspond to the meter monitored by a utility provider. The detected event can correspond to a demand response from a utility provider, such as a demand response corresponding to a rate for electricity consumed. The detected event can correspond to a net load command. The net load command can be received from a server or from a cloud connected application. The detected event can correspond to the amount of electricity to be consumed from the second grid, via the meter monitored by the utility provider. The amount of electricity to be consumed from the second grid can be reduced or limited. The reduced or limited amount of electricity from the second grid can amount to a fraction of the electricity to be consumed by energy loads on the first grid. The data processing system can detect the event and determine that the difference between the limited or reduced electricity from the second grid and the amount of electricity to be consumed by the energy loads on the first grid is to be provided by the energy storage systems on the first grid. The event can correspond to the amount of electricity to be provided by the energy storage systems on the first grid (e.g. local grid). The amount of electricity provided by the energy storage systems on the local grid can be used to compensate or make up for the difference between the reduced or limited electricity from the second grid and the amount of electricity the user or users on the first grid are predicted to consume, such as for example over a time interval. The data processing system can detect the event corresponding to an amount of electricity consumption from the utility provider via the second grid.

At ACT 410, data can be received. The data processing system can receive the data via a controller of the first grid. The data can include a plurality of amounts of electricity consumption monitored by a corresponding plurality of sub-meters on the first grid. The data can include state information for a first energy storage system of a plurality of energy storage systems on the first grid. The data can include state information for a second energy storage system of the plurality of energy storage systems on the first grid. The data can include state information from an energy storage system on a vehicle, such as an electric vehicle automobile, truck or a motorbike. The data can include state information from an energy storage system on a hybrid vehicle, such as a hybrid automobile, truck or a motorbike. The data can include a plurality of state information corresponding to the plurality of energy storage systems. The data received can include any one or more of energy levels 118, set points 116 and constraints 122 from any one or more energy storage systems on the first grid (e.g. local grid). The data received can include readings from any number of submeters or energy loads on the first grid. The data received can be a real time data and can be received via an internet connection, such as via a network 101 communication or a VPN. Data can be received by a data processing system operating on a cloud or on a VPN. Data can be received from the controller or from the energy storage systems 112, submeters 110, or meter 108 directly.

At ACT 415, a set point can be determined. For example, the data processing system can determine to modify a set point for the first energy storage system responsive to the event at ACT 405. The data processing system can determine to modify the set point for the first energy storage system based on the state information and the plurality of amounts of electricity consumption monitored by the plurality of sub-meters on the first grid. The data processing system can determine, responsive to the event at ACT 405, to modify the set point to reduce the amount of electricity consumption from the utility provider using the plurality of amounts of electricity consumption corresponding to the plurality of energy storage systems on the first grid. The data processing system can predict an amount of electricity consumption for one or more energy loads of the first grid over a time interval. The data processing system can determine an average amount of electricity to be provided by each energy storage system of the plurality of energy storage systems over the time interval.

The data processing system can predict a first amount of electricity to be provided by the first energy storage system based on a first state information of the first energy storage system. The data processing system can determine an updated first amount of electricity based on a constraint of the first energy storage system. The data processing system can predict the first amount of electricity using a simulation of the plurality of energy storage system. The simulation can include state information for each energy storage system. The simulation can determine electricity outputs from each energy storage system of the plurality of energy storage systems, based on the input set points for the energy storage systems.

The data processing system can predict a second amount of electricity to be provided by a second energy storage system of the plurality of energy storage systems based on the state information and a second state information of the second energy storage system. The data processing system can determine to modify the set point to reduce the first amount of electricity and the second set point to increase the second amount of electricity based on a determination that a first energy level of the first energy storage system is below a threshold.

The data processing system can determine to modify the set point of the first energy storage system responsive to determining that the set point is within a constraint of the first energy storage system. The data processing system can determine to charge at least one energy storage system of the plurality of energy storage systems using electricity from the second grid in response to a determination that an energy level of the at least one energy storage system is below a threshold. The data processing system can determine to modify the set point on the energy storage system on a vehicle, such as an electric vehicle or a hybrid vehicle.

The data processing system can determine to modify the set point for first energy storage system for a second time interval based on updated state information of the first energy storage system. The data processing system can modify a duration of the second time interval to be different than a duration of the first time interval. The data processing system can determine, responsive to the event at ACT 405, to modify a plurality of set points corresponding to the plurality of energy storage systems based on the plurality of state information and the plurality of amounts of electricity consumption monitored by the plurality of sub-meters on the first grid.

In response to a detected event at ACT 405, the data processing system can determine a change in electricity consumed over a time interval. In response to a detected event at ACT 405, the data processing system can determine the difference between the amount of electricity to be provided by the utility provider over a time interval and the amount of electricity to be consumed by one or more energy loads at the first grid (e.g. local grid) over the time interval. The time interval can correspond to a balancing interval. The balancing interval can include a time interval over which the energy provided by the energy storage systems is to be balanced. Balancing energy storage systems can be balanced so as to provide more electricity from an energy storage system with an energy level higher than a threshold than the amount of electricity provided by an energy storage system having an energy level that is lower than a threshold. The data processing system can determine a total energy stored in the plurality of energy storage systems on the first grid (e.g. local grid). The data processing system can determine a predicted change in the amount of energy stored in the energy storage systems of the first grid (e.g. local grid) over the balancing interval. The predicted change can include the predicted difference between the amount of energy stored in the energy storage systems of the first grid between the start of the balancing interval and the end of the balancing interval. The data processing system can determine a predicted change in the amount of energy for each individual energy storage system over the balancing interval. The predicted change in the amount of energy for each individual energy storage system can include the predicted difference between the amount of energy stored in the individual energy storage system between the start of the balancing interval and the end of the balancing interval. The data processing system can determine the change in energy and power consumption that each energy storage system will contribute over the balancing interval. The data processing system can adjust the amount of energy and power consumption that one or more energy storage system will contribute over the balancing interval in response to at least one energy storage system having an energy level that is below a threshold. The data processing system can adjust the amount of energy and power consumption from one or more energy storage systems will contribute over the balancing interval in response to at least one energy storage system violating a constraint.

At ACT 420, a command can be provided to the controller. Based on the determination to modify the set point in ACT 415 and in response to the event detected corresponding to the meter monitored by the utility provider in ACT 405, the data processing system can provide a command to the controller of the first grid to modify the set point for the first energy storage system on the first grid. The data processing system can provide the command to the controller to modify the set point for the first energy storage system based on the first amount of electricity. The data processing system can provide a second command to the controller to modify a second set point for the second energy storage system based on the second amount of electricity. The data processing system can provide the command to the controller to modify the set point of the first energy storage system for a first time interval. The data processing system can provide a command to the controller comprising the set point for the first energy storage system for the first time interval. The data processing system can provide a command to the controller responsive to determining that at least one or more energy storage systems will operate within their constraints using the modified set point. The data processing system can provide a command to the controller responsive to determining that all energy storage systems will operate within their constraints using the modified set points.

Responsive to the command at ACT 420, energy storage systems can provide electricity, energy or power in accordance with, responsive to, or based on, one or more set points established for the energy storage systems. For example, an energy storage system onboard an electric vehicle can provide electricity, via a bi-directional charger, responsive to, based on, or in accordance with one or more set points determined for this energy storage system. For example, each energy storage system can provide electricity in accordance with, based on, or responsive to one or more set points determined or established for that individual energy storage system. The electricity, energy or power provided by each energy storage system can remain with one or more constraints for each energy storage system.

Figure 5:
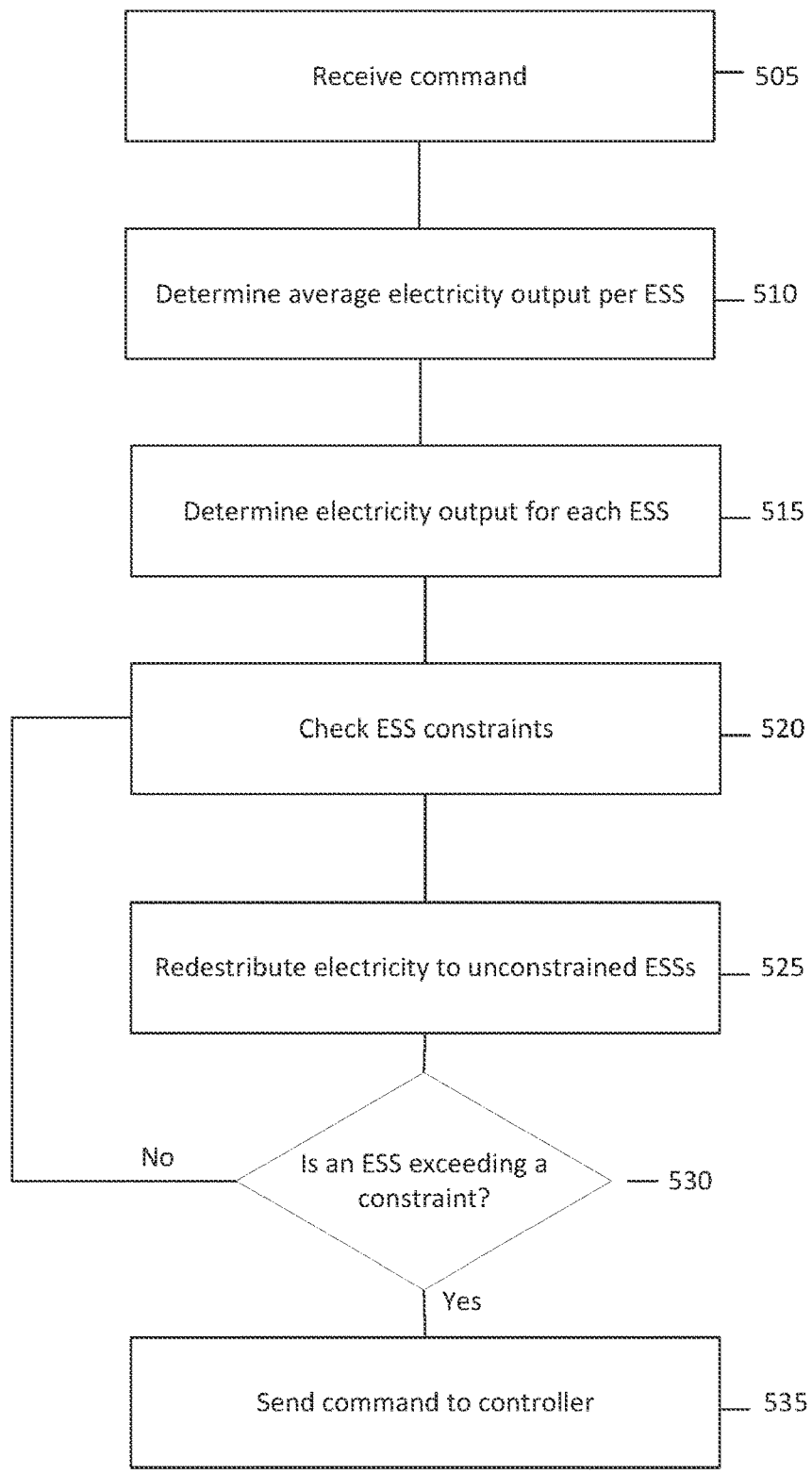
FIG. 5 illustrates an example method for operating multiple energy storage systems.

FIG. 5 illustrates an example method 500. The method 500 can be implemented by system 100 and can include ACTS 505 through 535. The method can include ACT 505 of receiving a command. At ACT 510, an average electricity output per ESS can be determined. At ACT 515, an electricity output for each ESS can be determined. At ACT 520, ESS constraints can be checked. At ACT 525, electricity can be redistributed to unconstrained ESSs. At ACT 530 a determination can be made if an ESS is exceeding a constraint. At ACT 535, a command can be sent to controller.

At ACT 505, a command is received. The data processing system can receive the command from a controller on the local grid. The command can be received from a utility meter. The command can be received based on a scheduled time to reduce electricity consumption from the utility provider at a set time, such as a time of a high rate for electricity consumption. The received command can include a utility net load command. The received command can identify the amount of electricity to be received or drawn from a utility provider on a utility grid. The amount of electricity can be limited to a set amount. The received command can include an amount of power or energy to be drawn. The received command can include the time interval over which the electricity from the utility provider is to be limited or reduced. The received command can identify that a set amount of electricity is to be received from the utility grid, via a utility meter, over a time interval. The time interval can include, for example, 30 minutes, 1 hour, 2 hours, 4 hours, 6 hours, 8 hours, 10 hours or 12 hours.

At ACT 510, an average electricity output per each ESS can be determined. The average electricity output can be determined by the data processing system. The average electricity can be determined by the forecaster of the data processing system. The forecaster can predict the total amount of electricity or power to be consumed by the local grid. The forecaster can predict the total amount of electricity or power to be consumed over a time interval, such as, 3 minutes, 5 minutes, 10 minutes or 15 minutes. The forecaster can determine the total difference between the total amount of electricity or power to be consumed by the local grid and the total amount of electricity to be received from the utility grid over the time interval. The forecaster can make the determination based on the command received at ACT 505. The forecaster can determine the average electricity output per ESS based on the difference between the total amount of electricity or power to be consumed by the energy loads on the local grid and the total amount of electricity to be received from the utility grid. The forecaster can determine the average electricity output per ESS based on the number of ESSs that will provide electricity over the time interval.

At ACT 515, an electricity output for each ESS can be determined. The data processing system can determine the electricity output for each individual ESS on the local grid. The data processing system can determine the set points for each individual ESS on the local grid in order to set their individual electricity outputs. The data processing system can determine set points of the individual ESSs so as to ensure that the sum of the electricity provided by all the ESSs for which the set points are determined equals or exceeds the difference between the demand by the local grid and the amount of electricity from the utility provider over the time interval. The data processing system can determine the amount of local grid load shifting from each storage asset to make up the total electricity output to satisfy the energy load on the local grid. The forecaster can predict the electricity output for each individual ESS on the local grid based on the average electricity determined at ACT 510. The forecaster can predict the electricity output for each individual ESS on the local grid based on the state information of each individual ESS. The forecaster can work together with the set point optimizer 154 to determine set points for each individual ESS to ensure the target electricity output of each ESS. For example, the forecaster can predict the electricity output of a first ESS based on the energy level of the first ESS and the average electricity output determined at ACT 510. The forecaster can determine that the first ESS has an energy level that exceeds a threshold and in response to that determination assign the amount of electricity for the first ESS. The threshold can be a predetermined threshold. The threshold can be determined based on the average electricity output determined at ACT 510. The set point optimizer 154 can determine the set point for the first ESS based on the determination of the forecaster.

At ACT 520, ESS constraints can be checked. The data processing system can determine if the set points for each individual ESS exceed a constraint for each individual ESS. For example, the data processing system can utilize a load balancer to determine if a minimum or a maximum energy load is exceeded. The data processing system can utilize a load balancer to determine if a minimum or a maximum state of charge for an ESS is exceeded. The data processing system can utilize a load balancer to determine if the minimum or maximum power constraint is exceeded.

At ACT 525, electricity can be redistributed to unconstrained ESSs. The redistribution can include load balancing the ESSs to ensure that ESSs that have a low energy levels provide less electricity than ESSs with a high energy levels. The redistribution of electricity can be implemented, for example, using a simulation. The simulation can be implemented by the data processing system. The data processing system can simulate ESSs on the local grid and the electricity they output. The data processing system can simulate operation of each ESSs. The simulation can determine, based on the electricity output from each ESS, that a particular ESS exceeds a constraint. The simulation can rearrange levels of electricity outputs from each ESS until all ESSs operate within constraint and output the intended amount of electricity in aggregate. For example, if any ESS exceeds the constraint at ACT 520, the set point for that ESS can be reduced to operate the ESS within the constraint. This can cause a reduction in the amount of produced electricity by the ESS whose set point was reduced to place it within the constraint. This reduction in the amount of produced electricity can be assigned to a different ESS whose energy levels are above a high energy level threshold.

For example, a determination can be made if or more ESSs have energy levels that are below a threshold to meet the demand of the average amount of electricity per ESS, such as for example determined at ACT 510. If one or more ESSs are found to be below the threshold, the data processing system can use a load balancer to draw more electricity from ESSs with higher energy levels and draw less electricity from ESSs with lower energy levels. For example, a load balancer can determine that an energy level of a first ESS is below a threshold for a low energy level ESS, while an energy level of a second ESS is above a threshold for a high energy level ESS. The low energy level can correspond to an ESS having a charge capacity of, for example, less than 30% of the total charge capacity. The high energy level threshold can correspond to an ESS having a charge capacity of, for example, at least 60% of the total charge capacity. The load balancer can determine to set the set point of the second ESS to produce an amount of electricity that is above the average amount of electricity determined at ACT 510 and set the set point for the first ESS to produce an amount of electricity that is below the average amount of electricity. The average electricity produced value by the first ESS and the second ESS together can be equal or greater than the average electricity for the plurality of ESSs determined at ACT 510. In the event that the average amount of energy is not met, another ESS with an energy level that is above the threshold for a high energy level ESS can be identified to provide additional electricity to ensure that the net load amount of electricity from ACT 505 is met.

At ACT 530 a determination can be made if an ESS is exceeding a constraint. For example, ESSs that were relied on to provide more electricity than the average amount determined at ACT 510, can be checked to ensure that they operate within their constraints. The constraints can be checked using the same methodology as discussed, for example, in ACT 520. For example, if one or more ESS fall within the constraint, the method 500 can then proceed to ACT 535. If one or more ESSs fail to operate within the constraint, the method 500 can then go to ACT 520 to revisit the constraints of the ESSs and redistribute electricity to unconstrained ESSs at step 525.

At ACT 535, a command can be sent to the controller. The data processing system can send one or more commands to the controller including one or more set points for one or more ESSs. A command can include the set points for a single ESS, a subset of ESSs or all ESSs. The set points can correspond to the amount of electricity to be provided by each ESS individually. The total amount of electricity provided by the ESSs based on the set points can equal or exceed the difference between the total amount of electricity demanded by the local grid energy loads and the limited electricity output from the utility grid as indicated in ACT 505.

Figure 6:
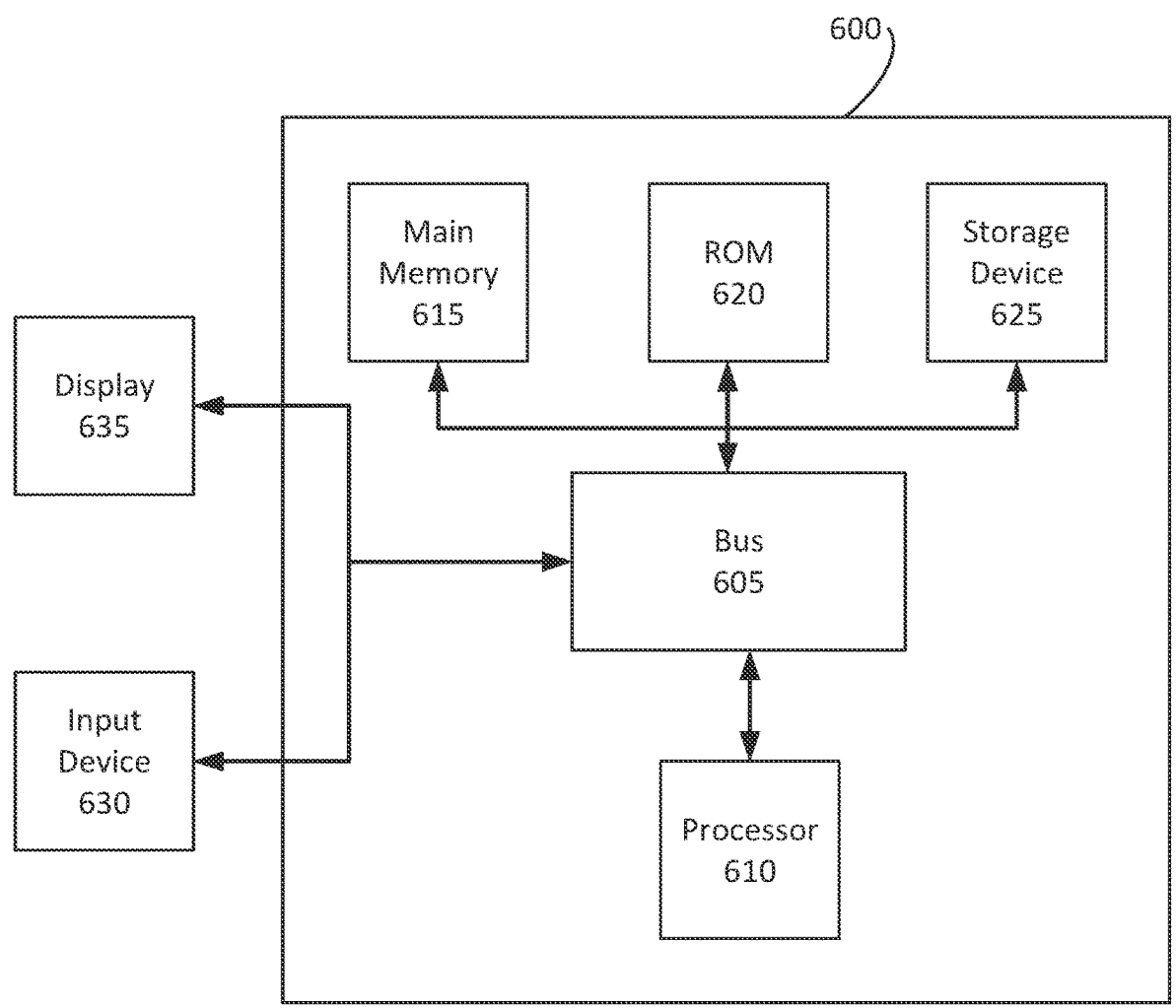
FIG. 6 depicts a block diagram illustrating an architecture for a computer system that can be employed to implement elements of the systems and methods described and illustrated herein, including, for example, the system depicted in FIGS. 1, 2 and 3, and the operational flows or methods depicted in FIGS. 4 and 5.

FIG. 6 is a block diagram of an example computer system 600. The computer system or computing device 600 can include or be used to implement the system 100, or its components such as the data processing system 140, ESS 112, meter 108, submeter 110, energy load 120 or controller 130. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information, and instructions to be executed by the processor 610. The main memory 615 can be or include the data repository for the ESS data 142 or state information 114. The main memory 615 can also be used for storing position information, temporary variables, or other intermediate information during execution of instructions by the processor 610. The computing system 600 can further include a read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions. The storage device 625 can include or be part of the data repository for ESS Data 142 or state information 114.

The computing system 600 can be coupled via the bus 605 to a display 635, such as a liquid crystal display, or active matrix display, for displaying information to a user. An input device 630, such as a keyboard including alphanumeric and other keys, can be coupled to the bus 605 for communicating information and command selections to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the data processing system 140, the controller 130 or other component of FIG. 1, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement can also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, event detector 150, load balancer 152, set point optimizer 154 and forecaster 156 and other data processing system 140 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 140) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 600 can include clients and servers. A client and server are generally remote from each other and typically interact through a communication network (e.g., the network 101). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 140).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the set point optimizer 154, forecaster 156 and load balancer 152 can be a single component, app, or program, or a logic device having one or more processing circuits, or part of one or more servers of the data processing system 140.

Having now described some illustrative implementations, it is apparent that the foregoing is illustrative and not limiting, having been provided by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system, comprising:
a data processing system comprising at least one processor coupled with memory, to:
detect an event at a first grid connected to a second grid via a meter monitored by a utility provider that distributes electricity via the second grid, the event corresponding to a demand response from the utility provider indicative of a change in a rate of electricity consumed;
receive, via a controller of the first grid, data comprising a plurality of amounts of electricity consumption monitored by a corresponding plurality of sub-meters on the first grid, a first state information for a first energy storage system of a plurality of energy storage systems on the first grid and a second state information for a second energy storage system of the plurality of energy storage systems of the first grid;
determine, responsive to the event, to modify a set point for the first energy storage system, the set point to be modified based on the first state information, the second state information and the plurality of amounts of electricity consumption monitored by the plurality of sub-meters on the first grid; and
provide, based on the determination to modify the set point in response to the event detected corresponding to the meter monitored by the utility provider, a command to the controller of the first grid to modify the set point for the first energy storage system on the first grid.

2. The system of claim 1, comprising the data processing system to:
detect the event corresponding to an amount of electricity consumption from the utility provider via the second grid; and
determine, responsive to the event, to modify the set point to reduce the amount of electricity consumption from the utility provider using the plurality of amounts of electricity consumption corresponding to the plurality of energy storage systems on the first grid.

3. The system of claim 1, comprising the data processing system to:
predict an amount of electricity consumption for one or more energy loads of the first grid over a time interval; and
determine an average amount of electricity to be provided by each energy storage system of the plurality of energy storage systems over the time interval.

4. The system of claim 1, comprising the data processing system to:
predict a first amount of electricity to be provided by the first energy storage system based on the first state information of the first energy storage system;
determine an updated first amount of electricity based on the first amount of electricity exceeding a constraint of the first energy storage system; and
provide the command to the controller to modify the set point for the first energy storage system based on the updated first amount of electricity.

5. The system of claim 1, comprising the data processing system to:
predict a second amount of electricity to be provided by the second energy storage system of the plurality of energy storage systems based on the first state information and the second state information of the second energy storage system; and
provide a second command to the controller to modify a second set point for the second energy storage system based on the second amount of electricity.

6. The system of claim 5, comprising the data processing system to:
determine to modify the set point to reduce the first amount of electricity and the second set point to increase the second amount of electricity, based on a determination that a first energy level of the first energy storage system is below a threshold.

7. The system of claim 1, comprising the data processing system to:
determine to modify the set point of the first energy storage system responsive to determining that the set point is within a constraint of the first energy storage system.

8. The system of claim 1, comprising the data processing system to:
determine to charge at least one energy storage system of the plurality of energy storage systems using electricity from the second grid in response to a determination that an energy level of the at least one energy storage system is below a threshold.

9. The system of claim 1, comprising the data processing system to:
provide the command to the controller to modify the set point of the first energy storage system for a first time interval;
determine to modify the set point for the first energy storage system for a second time interval based on updated first state information of the first energy storage system; and
provide a second command to the controller comprising the modified set point for the first energy storage system for the second time interval.

10. The system of claim 1, comprising the data processing system to:
receive, via the controller, a plurality of state information comprising the first state information and the second state information corresponding to the plurality of energy storage systems; and
determine, responsive to the event, to modify a plurality of set points comprising the set point, the plurality of set points corresponding to the plurality of energy storage systems based on the plurality of state information and the plurality of amounts of electricity consumption monitored by the plurality of sub-meters on the first grid.

11. A method of controlling distributed energy storage systems, comprising:
detecting, by a data processing system comprising a processor coupled to memory, an event at a first grid connected to a second grid via a meter monitored by a utility provider that distributes electricity via the second grid, the event corresponding to a demand response from the utility provider indicative of a change in a rate of electricity consumed;
receiving, by the data processing system via a controller of the first grid, data comprising i) a plurality of amounts of electricity consumption monitored by a corresponding plurality of sub-meters on the first grid, and ii) a first state information for a first energy storage system of a plurality of energy storage systems on the first grid and a second state information for a second energy storage system of the plurality of energy storage systems of the first grid;

determining, by the data processing system responsive to the event, to modify a set point for the first energy storage system, the set point to be modified based on the first state information, the second state information and the plurality of amounts of electricity consumption monitored by the plurality of sub-meters on the first grid; and providing, by the data processing system based on the determination to modify the set point in response to the event detected corresponding to the meter monitored by the utility provider, a command to the controller of the first grid to modify the set point for the first energy storage system on the first grid.

12. The method of claim 11, comprising:

detecting, by the data processing system, the event corresponding to an amount of electricity consumption from the utility provider via the second grid; and determine, responsive to the event, to modify the set point to reduce the amount of electricity consumption from the utility provider using the plurality of amounts of electricity consumption corresponding to the plurality of energy storage systems on the first grid.

13. The method of claim 11, comprising:

predicting, by the data processing system, an amount of electricity consumption for one or more energy loads of the first grid over a time interval; and determining, by the data processing system, an average amount of electricity to be provided by each energy storage system of the plurality of energy storage systems over the time interval.

14. The method of claim 11, comprising:

predicting, by the data processing system, a first amount of electricity to be provided by the first energy storage system based on the first state information of the first energy storage system;

determining, by the data processing system, an updated first amount of electricity based on the first amount of electricity exceeding a constraint of the first energy storage system; and providing, by the data processing system, the command to the controller to modify the set point for the first energy storage system based on the updated first amount of electricity.

15. The method of claim 11, comprising:

predicting, by the data processing system, a second amount of electricity to be provided by the second energy storage system of the plurality of energy storage systems based on the first state information and the second state information of the second energy storage system; and providing, by the data processing system, a second command to the controller to modify a second set point for the second energy storage system based on the second amount of electricity.

16. The method of claim 15, comprising:

determining, by the data processing system, to modify the set point to reduce the first amount of electricity and the second set point to increase the second amount of electricity, based on a determination that a first energy level of the first energy storage system is below a threshold.

17. The method of claim 11, comprising:

determining, by the data processing system, to modify the set point of the first energy storage system responsive to determining that the set point is within a constraint of the first energy storage system.

18. The method of claim 11, comprising:

determining, by the data processing system, to charge at least one energy storage system of the plurality of energy storage systems using electricity from the second grid in response to a determination that an energy level of the at least one energy storage system is below a threshold.

19. The method of claim 11, comprising:

providing, by the data processing system, the command to the controller to modify the set point of the first energy storage system for a first time interval;

determining, by the data processing system, to modify the set point for first energy storage system for a second time interval based on updated first state information of the first energy storage system; and providing, by the data processing system, a second command to the controller comprising the modified set point for the first energy storage system for the first time interval.

20. The method of claim 19, comprising:

modifying, by the data processing system, a duration of the second time interval to be different than a duration of the first time interval;

receiving, by the data processing system, via the controller, a plurality of state information comprising the first state information and the second state information and corresponding to the plurality of energy storage systems; and determining, by the data processing system, responsive to the event, to modify a plurality of set points comprising the set point, the plurality of set points corresponding to the plurality of energy storage systems based on the plurality of state information and the plurality of amounts of electricity consumption monitored by the plurality of sub-meters on the first grid.

\* \* \* \* \*